United States Patent
Long et al.

(10) Patent No.: US 6,644,720 B2
(45) Date of Patent: Nov. 11, 2003

(54) ADJUSTABLE TRAILER UNDERBODY FAIRING

(75) Inventors: Kenneth S. Long, Chilliwack (CA); Robert W. Suggitt, Burnaby (CA)

(73) Assignee: Windyne Inc., Blaine, WA (US)

( * ) Notice: Subject to any disclaimer, the term of this patent is extended or adjusted under 35 U.S.C. 154(b) by 0 days.

(21) Appl. No.: 10/229,393

(22) Filed: Aug. 26, 2002

(65) Prior Publication Data

US 2003/0057736 A1 Mar. 27, 2003

Related U.S. Application Data

(60) Provisional application No. 60/314,815, filed on Aug. 24, 2001.

(51) Int. Cl.[7] .............................................. B60R 27/00
(52) U.S. Cl. .................................................. 296/180.4
(58) Field of Search ........................... 296/180.1, 180.2, 296/180.4

(56) References Cited

U.S. PATENT DOCUMENTS

| | | | | |
|---|---|---|---|---|
| 4,518,188 A | * | 5/1985 | Witten ..................... | 296/180.2 |
| 4,611,847 A | | 9/1986 | Sullivan ..................... | 296/1 S |
| 4,640,541 A | * | 2/1987 | FitzGerald et al. ...... | 296/180.1 |
| 4,746,160 A | | 5/1988 | Wiesemeyer ............... | 296/1 S |
| 5,280,990 A | | 1/1994 | Rinard ..................... | 296/180.1 |
| 5,609,384 A | | 3/1997 | Loewen ................... | 296/180.4 |
| 5,921,617 A | | 7/1999 | Loewen et al. .......... | 296/180.4 |

* cited by examiner

Primary Examiner—Dennis H. Pedder
Assistant Examiner—Lori L Coletta
(74) Attorney, Agent, or Firm—Seed IP Law Group PLLC

(57) ABSTRACT

An adjustable trailer underbody fairing for a trailer having an adjustable rear wheel assembly and a corresponding tractor unit having rear wheels, the fairing including first and second fairing sections attached to the rear wheel assembly and trailer, respectively, and an adjustable fairing panel coupled to the first and second fairing sections that extends and collapses as the rear wheel assembly is moved to present a planar fairing surface at all times. The fairing can be selectively raised to provide access beneath the trailer.

16 Claims, 12 Drawing Sheets

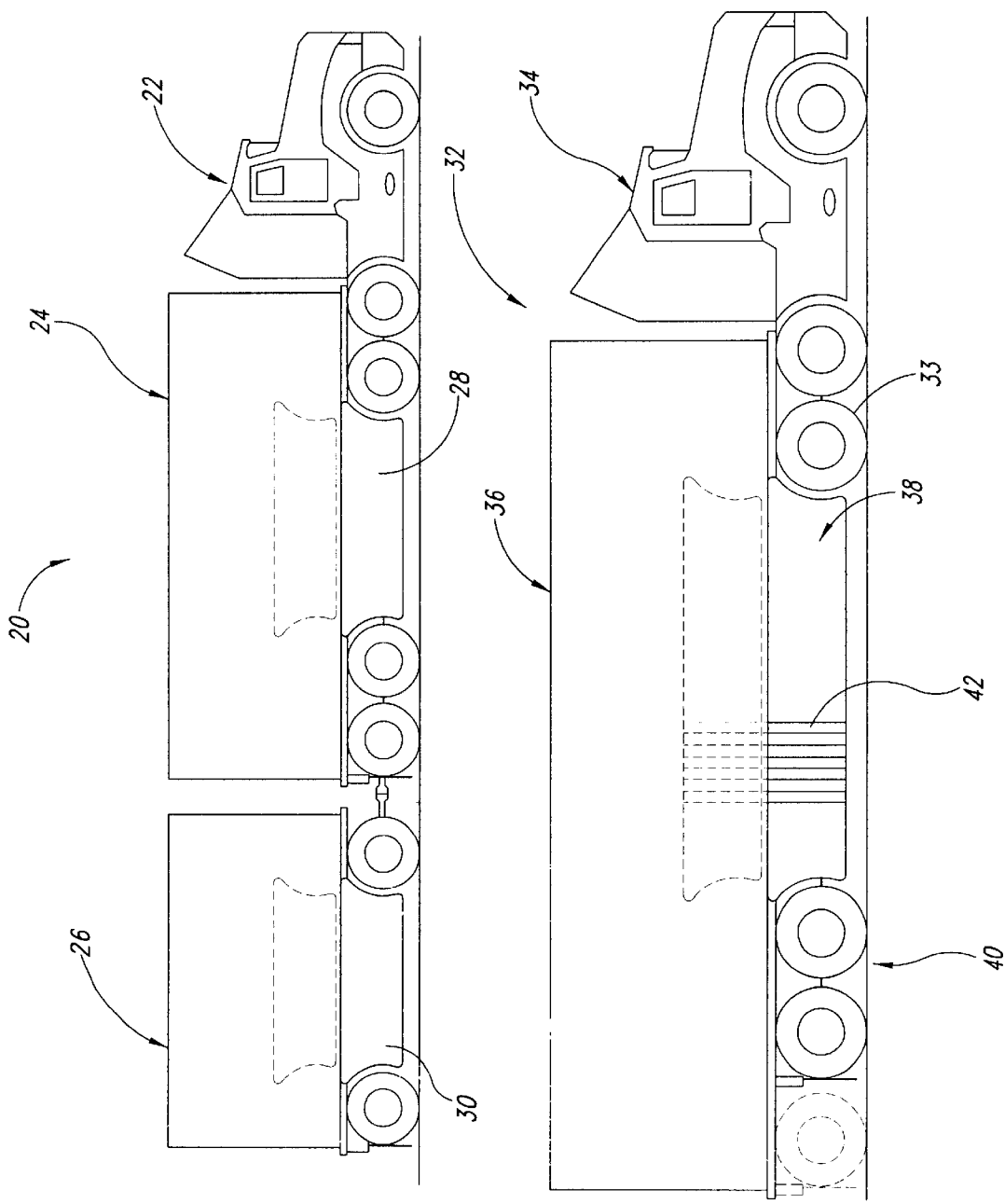

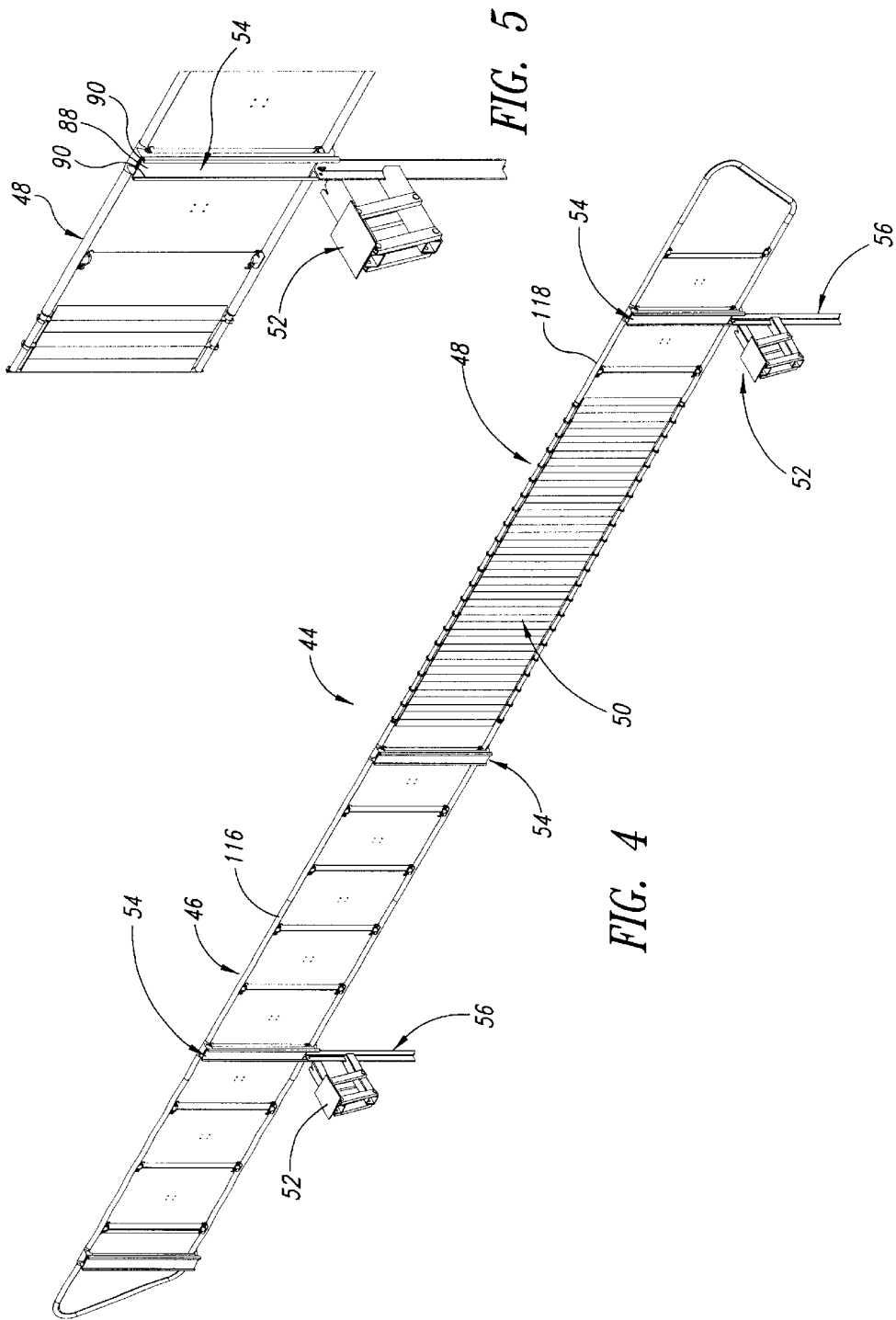

ADJUSTABLE TRAILER UNDERBODY FAIRING

CROSS-REFERENCE TO RELATED APPLICATION

This application claims the benefit of U.S. Provisional Patent Application No. 60/314,815 filed Aug. 24, 2001, where this provisional application is incorporated herein by reference in its entirety.

BACKGROUND OF THE INVENTION

1. Field of the Invention

The present invention pertains to trailer fairings, and more particularly to a longitudinally and vertically adjustable trailer underbody fairing.

2. Description of the Related Art

It is known that fuel economy can be improved in the long-distance haulage of trailers by utilizing fairings mounted beneath each of the trailer's lower, outer longitudinal edges. Ideally, such fairings extend between the rear trailer wheel assembly and the wheels of a tractor unit attached to the front of the trailer.

The trailer wheel assembly is commonly longitudinally repositioned relative to the trailer to achieve proper load distribution. If the fairing cannot be adjusted quickly and easily to accommodate repositioning of the wheel assembly, then the length of the fairing will not be optimized to reach maximum fuel economy. Hence, the length of the fairing must be reduced to ensure that the wheel assembly can be repositioned throughout its entire range without interfering with the fairing.

Prior fairing designs did not accommodate longitudinal adjustment, resulting in substantial gaps between the fairing and the wheel assembly. Such gaps reduce the fairing's efficiency, and hence fuel economy, resulting in greater fuel costs.

Attempts to overcome this disadvantage have resulted in complex, heavy fairing assemblies that, while perhaps achieving some aerodynamic efficiency, offset the resulting fuel economy with increased weight. That, as well as the cost of manufacturing such complicated devices and a reluctance of drivers and mechanics to use such devices, have made them unfeasible. Hence, there is a need for a lightweight, low cost, easily-adjustable fairing that maximizes aerodynamic flow of air around the trailer and that is easy to use when repositioning the rear wheels in order to minimize gaps between the fairing and the wheels of the trailer and tractor unit.

BRIEF SUMMARY OF THE INVENTION

The disclosed and claimed embodiments of the invention are directed to a fairing for a trailer, the trailer having an adjustable rear wheel assembly and configured for attachment to a tractor unit also having rear wheels, the fairing including a first fairing section configured for attachment to the trailer rear wheel assembly, a second fairing section configured for attachment to the trailer adjacent the front of the trailer and the rear wheels of the tractor unit and in slideable engagement with the first fairing section; and an adjustable fairing panel coupled to the first and second fairing sections, the adjustable fairing panel configured to extend and collapse as the position of the rear wheel assembly is adjusted longitudinally relative to the trailer.

In accordance with another aspect of the present invention, a fairing is provided that includes a telescopic frame having a foldable panel attached thereto. Ideally, the foldable panel includes a plurality of vertically-oriented slats slideably mounted on the telescopic frame, the plurality of slats having fabric mounted thereon. Preferably, the slats are mounted to rotate about a vertical axis to guide the foldable panel into a collapsed configuration and to facilitate extension of the panel.

In accordance with a further aspect of the present invention, the foldable panel is constructed of fabric that, ideally, is mounted under tension on the telescopic frame.

In accordance with another embodiment of the invention, a fairing for a trailer is provided having a fairing mount system that permits the fairing to move between a lowered operational configuration and an extended and raised configuration for access to the underside of the trailer. Ideally, the fairing is slideably mounted to the fairing mounts to vertically slide with respect to the fairing mounts.

As will be readily appreciated from the foregoing, the fairing of the present invention is a light-weight planar structure designed to control airflow on the lower sides of a conventional trailer, including freight box vans. The planar structure is positioned parallel to and below the sides of the trailer extending from forward of the trailer wheels to just after the tractor wheels, and it extends as close as practical to the ground. The fairing structure enables covering a variable area between the trailer and tractor wheels, which can be adjustable axially by up to as much as eleven feet.

BRIEF DESCRIPTION OF THE SEVERAL VIEWS OF THE DRAWING(S)

The foregoing features and advantages of the present invention will be more readily appreciated as the same become better understood from the following detailed description when taken in conjunction with the accompanying drawings, wherein:

FIG. 1 is a side elevational view of a tractor unit coupled to a main trailer and a pup trailer, both trailers having fairings formed in accordance with the present invention;

FIG. 2 is a side elevational view of a tractor unit coupled to a single trailer having a fairing formed in accordance with the present invention;

FIG. 4 is an isometric projection of the fairing assembly of FIG. 3 in an extended configuration;

FIG. 5 is an enlarged partial view of a fairing mount and a portion of the fairing assembly of FIG. 4;

DETAILED DESCRIPTION OF THE INVENTION

Figure 3:
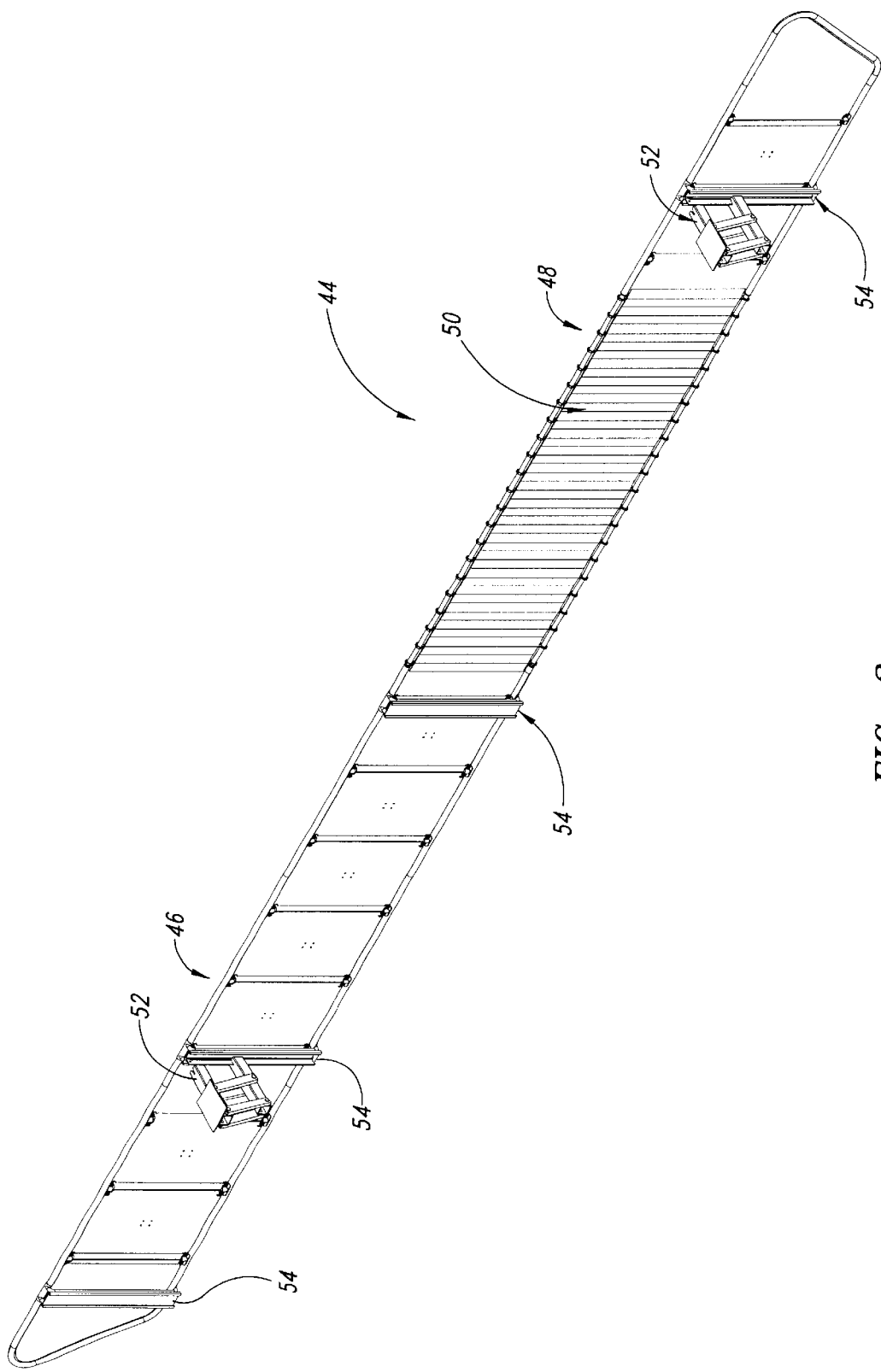
FIG. 3 is an isometric projection of a fairing assembly formed in accordance with the present invention.

Referring initially to FIG. 1, shown therein is a tractor trailer unit 20 having a tractor 22 coupled to a main trailer 24 that in turn is coupled to a pup trailer 26. A first adjustable fairing 28 is shown in solid lines in an operational configuration on the main trailer 24. Similarly, a second adjustable fairing 30 is shown in an operational configuration on the pup trailer 26 in solid lines and in a raised configuration in dashed lines.

The present invention is also adaptable for use with a tractor trailer unit 32 having a tractor 34 and a single trailer 36. Here, an adjustable fairing 38 is shown in solid lines in an operational configuration and in dashed lines in a raised configuration. In the embodiment shown in FIG. 2, the trailer 36 has a rear wheel assembly 40 mounted thereon to slide longitudinally (towards and away from the rear wheels 33 of the tractor 34), as shown by the solid lines of the rear wheel assembly 40 in a forward position and the dashed lines in a rearward position.

The adjustable fairing 38 includes an adjustable fairing panel 42 that folds and unfolds in an accordion-like fashion to permit adjustment in the fairing 38.

Referring next to FIG. 3, shown therein is a fairing assembly 44 formed in accordance with one embodiment of the invention. The fairing assembly 44 includes a first fairing section 46 slideably attached to a second fairing section 48, preferably in telescopic fashion. An adjustable fairing panel 50 is slideably mounted to the second fairing section 48 and coupled to the first fairing section 46 to collapse and extend in response to movement of the first and second fairing sections 46, 48 with respect to each other. Lifting mounts 52 are shown in slideable engagement with a fairing mount 54 on the first and second fairing sections 46, 48. A third fairing mount 54 is shown near the center of the fairing assembly where the first and second fairing sections 46, 48 are telescopically joined. For purposes of illustration, the corresponding lifting mount is not shown.

The adjustable fairing panel 50 is shown in FIG. 3 in a fully extended configuration so that the fairing assembly 44 is at its maximum length. In addition, the lifting mounts 52 are shown in an unlatched and partially extended configuration but without the first and second fairing sections 46, 48 in a raised position. FIG. 4 shows the first and second fairing sections 46, 48 in a raised position relative to the lifting mounts 52. A more detailed view of the second fairing section with respect to its relationship with the lifting mount 52 is shown in FIG. 5. As can be seen in FIGS. 4 and 5, the first and second fairing sections 46, 48 slide vertically relative to the lifting mount 52.

Figure 6:
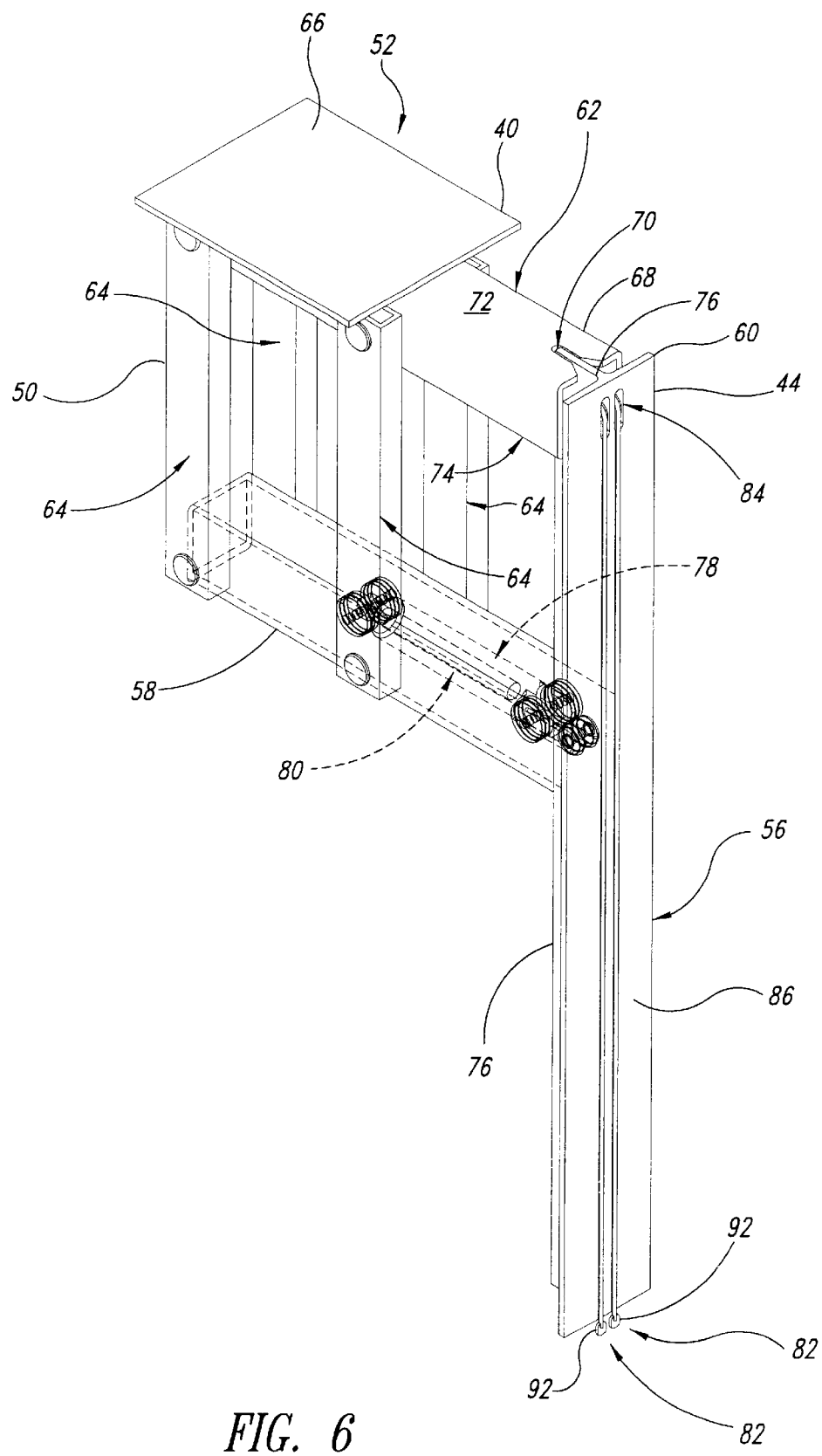
FIG. 6 is an isometric projection of a fairing mount in an operational configuration.
Figure 7:
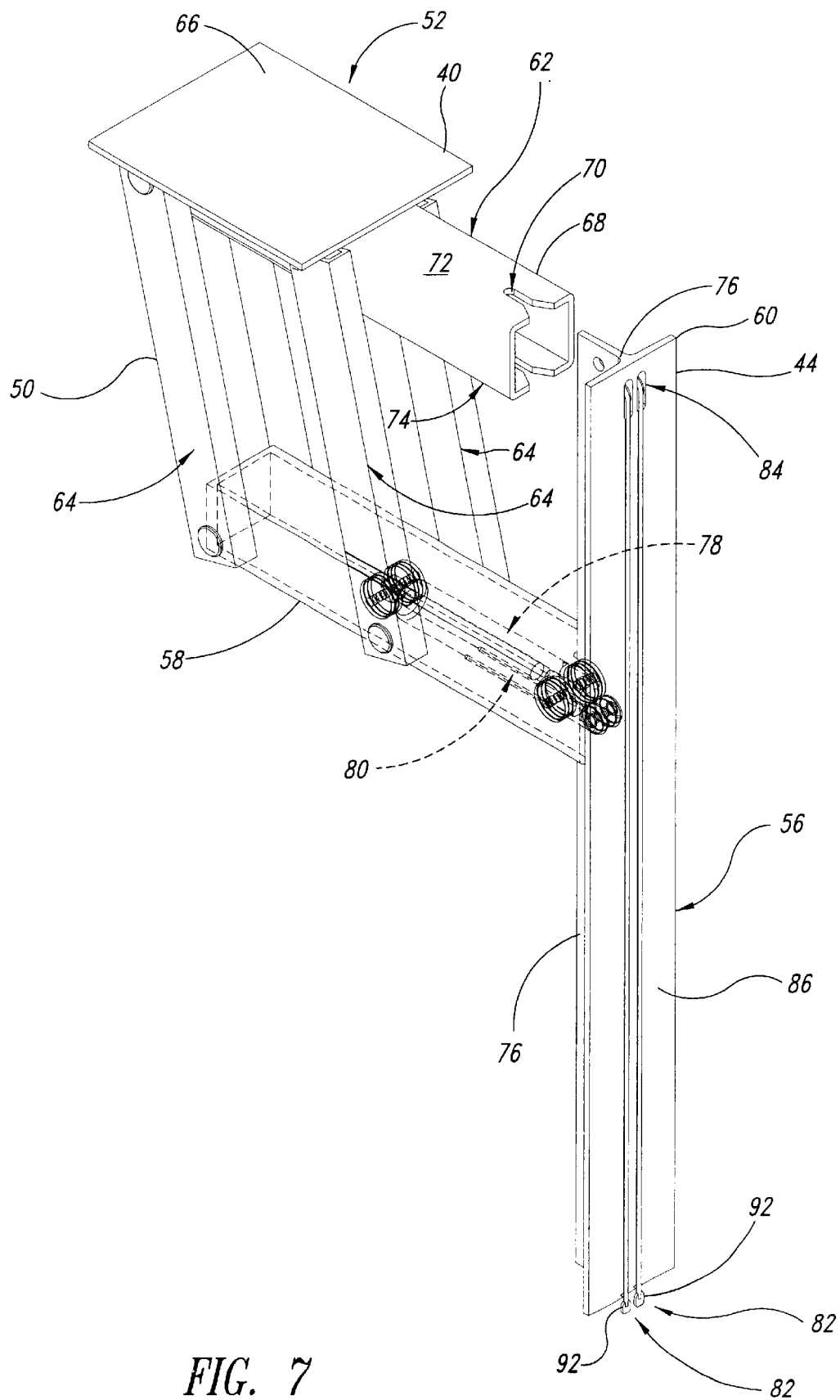
FIG. 7 is an isometric view of the fairing mount of FIG. 6 in an unlatched and extended configuration.

A single lifting mount 52 is shown in FIGS. 6 and 7 having a T-shaped bar or T-bar 56 rotatably mounted to a lower moving member 58. The T-bar 56 has a top end 60 that engages a top bar 62. Parallel swing arms 64 are pivotally coupled to the top bar 62 and the lower moving member 58 to permit movement of the lower moving member 58 relative to the top bar 62. A mounting plate 66 is fixedly attached to the top bar 62 to provide an attachment point to the trailer 36 or rear wheel assembly 40. Ideally, the mounting plate 66 is sized to straddle at least two longitudinal rails beneath the trailer (not shown) or channels (not shown) on the exterior bottom of the trailer.

The top bar 62 in this embodiment of the invention comprises a hollow tube having a square-shaped cross-sectional configuration with a projecting end 68. A slot 70 formed in a top wall 72 and a bottom wall 74 of the projecting end 68 that is sized and shaped to receive the stem 76 on the T-bar 56. The stem 76 is retained within the slot 70 by a conventional slam latch (not shown) which is known to those of skill in the art and readily commercially available. Hence, the slam latch will not be described in more detail herein. Alternatively, other retaining methods may be used, such as a retaining pin slid through openings in the stem 76 and the top bar 62.

Each lifting mount 52 includes an energy storage device, such as a gas spring 78, mounted in the internal axial bore 80 of the lower moving member 58. The gas spring 78 is coupled to a pair of cables 82 that extend through openings 84 in the T-bar 56. Preferably, the cables 82 lie within channels (not shown) formed in the exposed face 86 of the T-bar 56. These cables 82 are used to support the first and second fairing sections 46, 48 on the lifting mounts 52, as will be described in more detail hereinbelow.

As shown in FIG. 7, when the T-bar 56 is unlatched from the top bar 62, the lower moving member 58 is free to extend outward via the parallel swing arms 64 such that the T-bar 56 is maintained in at least the same vertical orientation or is permitted to pivot slightly outward with the top end 60 extending away from the top bar 62. This is the configuration shown for the lifting mounts 52 in FIG. 3.

Referring again to FIG. 5, the fairing mount 54 comprises a planar back wall 88 having a pair of longitudinal channels 90 formed along each longitudinal side thereof. The fairing mount 54 is sized and shaped to be slideably received over the T-bar 56 as shown in FIG. 5. Thus, the fairing mount 54 slides longitudinally along the T-bar 56 to move the first and second fairing sections 46, 48 from a lowered operational configuration (shown in FIG. 2) to a raised configuration (shown in phantom in FIG. 2 and in FIGS. 4 and 5). The fairing mount 54 is prevented from sliding off the T-bar 56 by attachment of the cable ends 92 to respective attachment points (not shown) on the fairing mount 54. The cables 82 also are used to raise the first and second fairing sections 46, 48 via operation of the gas spring 78. It is to be understood that other energy storage elements may be used, such as a mechanical spring, as will be known to those skilled in the art.

Figure 13:
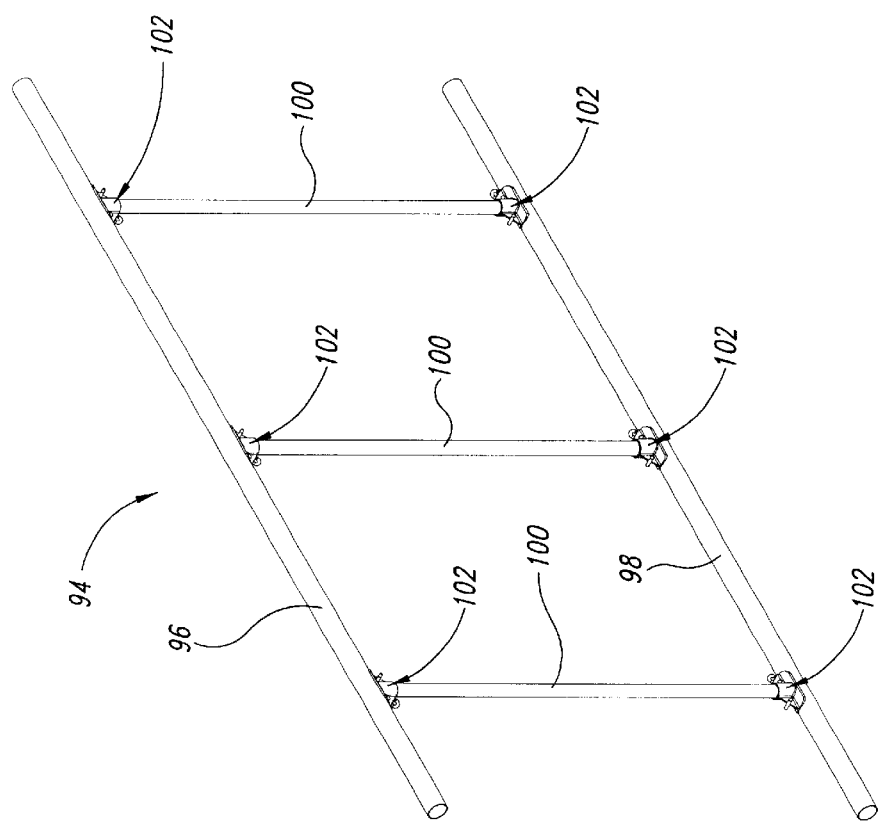
FIG. 13 is an isometric projection of a fairing frame section formed in accordance with the present invention.

The fairing sections 46, 48 are formed around a tubular frame 94 made up of longitudinal runners 96, 98 and transverse supports 100 that form a ladder-type structure, as shown in FIG. 13. Frame gussets 102 are used to couple the transverse supports 100 to the longitudinal runners 96, 98.

Figure 14:
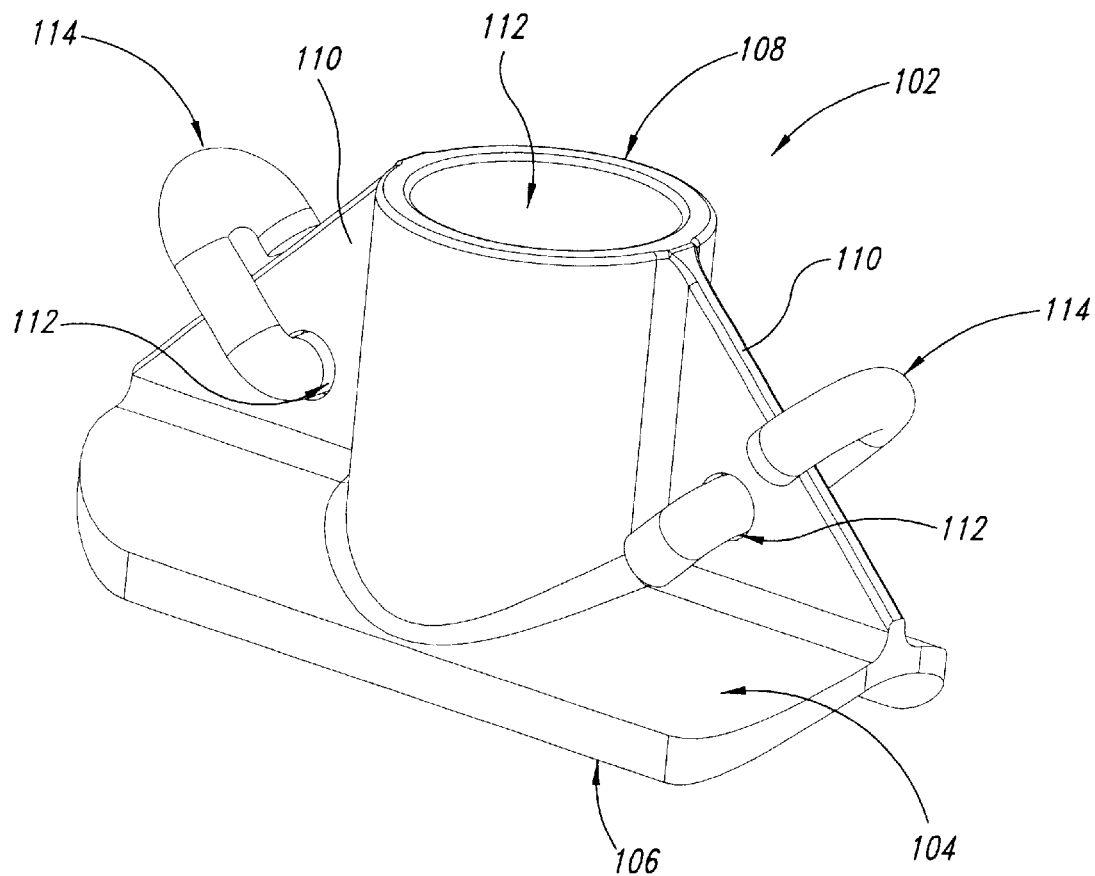
FIG. 14 is an isometric projection of a fairing frame gusset of the present invention.
Figure 15:
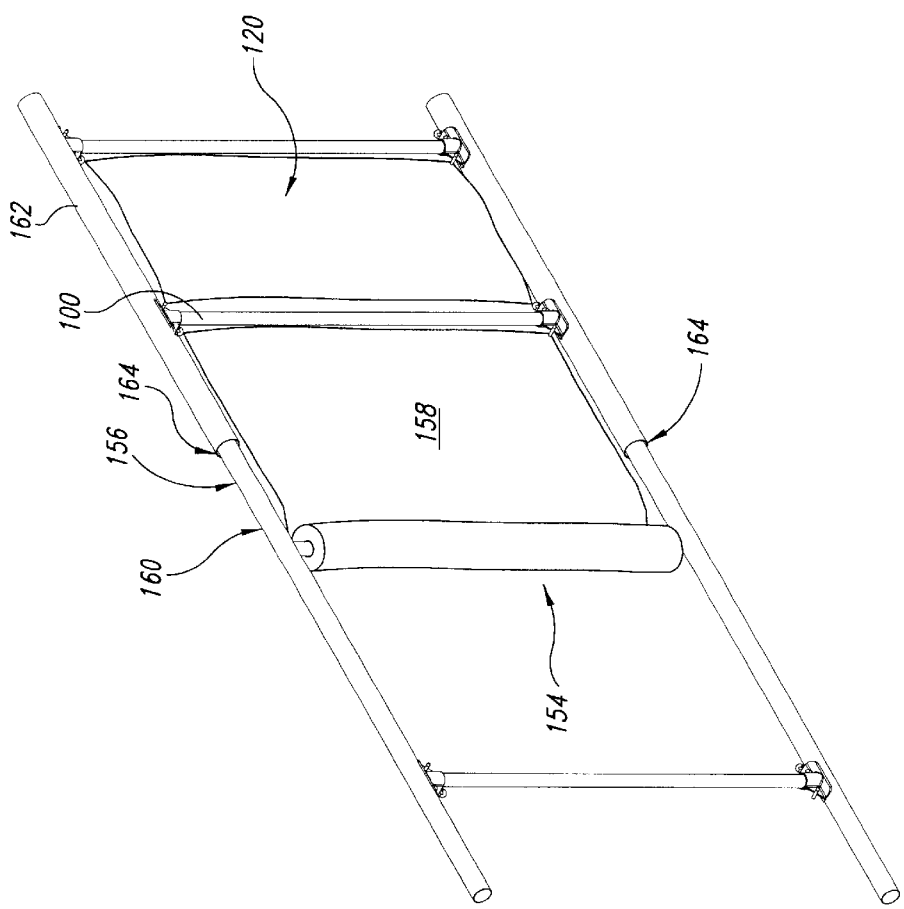
FIG. 15 is an isometric projection of an alternative embodiment of a collapsible fairing panel using a take-up spool.

As shown in FIG. 14, each of the gussets 102 has the configuration shown therein, which includes a base 104 having a curved bottom surface 106 sized and shaped to mate with the exterior of the longitudinal runners 96, 98, and a socket 108 projecting outward from the base 104. A pair of triangular-shaped braces 110 reinforce the socket 108 on the base 104. The socket 108 includes an opening 112 sized and shaped to receive the transverse support 100 therein in slideable engagement. Openings 112 are formed in the braces that receive a hook 114. Ideally the hook 114 is in the shape of a question mark.

The first fairing section 46 has its tubular frame 116 sized and shaped so that the longitudinal runners are slideably engaged with the tubular frame 118 of the second fairing section 48. Ideally, the one tubular frame telescopically cooperates with the other tubular frame in the same manner as a trombone slide to extend and retract, thereby changing the overall length of the fairing assembly 44. The tubular frame 116 of the first fairing section 46 may be the larger or the smaller of the frame members to receive the tubular frame 118 of the second fairing section 48.

The fairing assembly 44 includes fairing panels 120 mounted to the tubular frames 116, 118 to form the skin of the fairing. Ideally, each fairing panel 120 is formed of a fiber reinforced plastic fabric that is cut and sewn together such that it can be attached at points along the length of each of the tubular frames 116, 118. To accommodate attachment of the fairing panels 120 to the frames 116, 118, rigid circular fasteners or D-rings 122 are sown into the corners of the fairing panels 120 for attachment to the hooks 114 on the gussets 102. Thus, the skin of the fairing assembly is divided up into connected rectangular panels 120 with a pattern of grommet-reinforced holes 124 near the center of each panel 120. A chord (not shown) can be inserted through these holes 124 and tightened to place each panel 120 in tension between the four corner attachment points, the D-rings 122, thus creating a structure fabricated from the tubular frame with the transverse members and the fairing panels 120.

Figure 9:
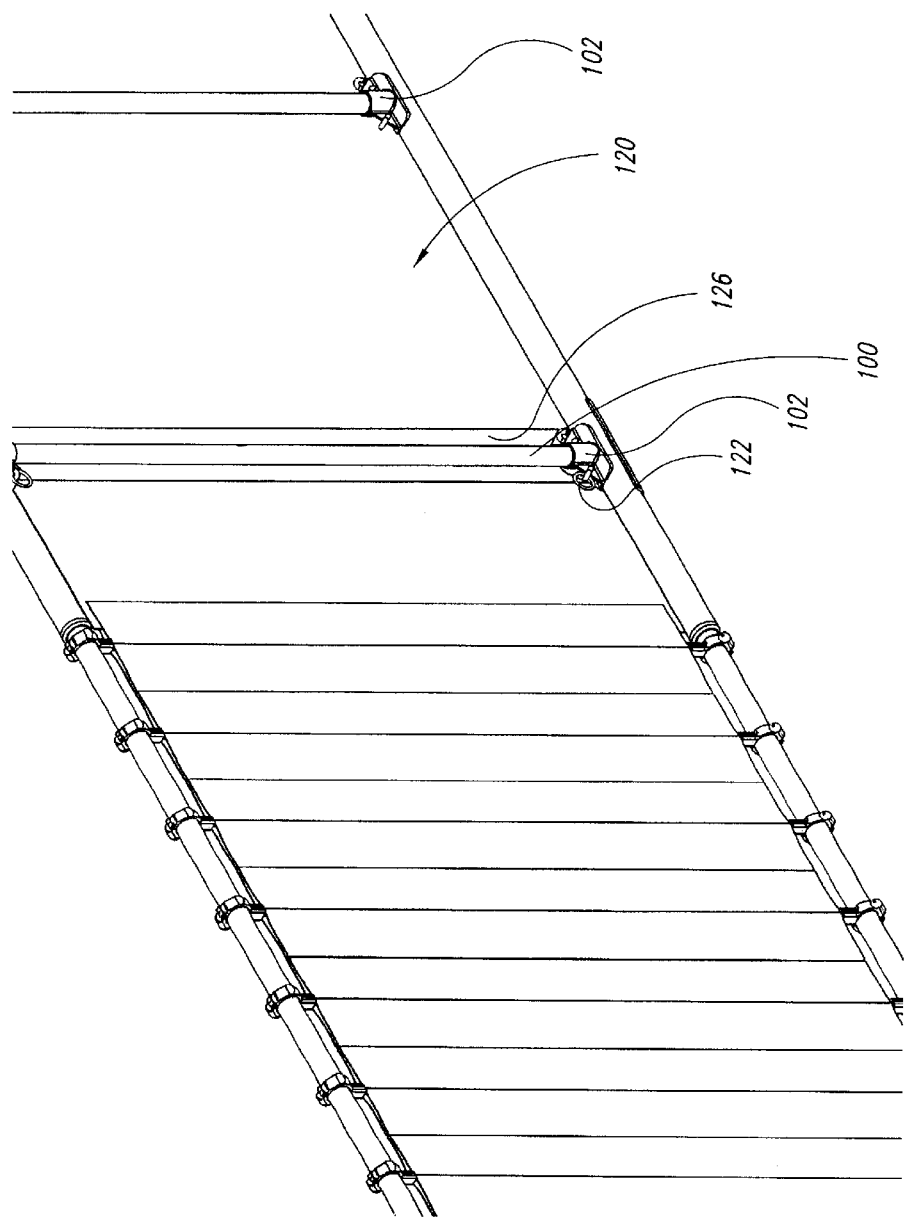
FIG. 9 is an isometric projection of a portion of an alternative embodiment of a fairing assembly of the present invention showing the foldable fairing panel in an extended configuration.

In the embodiment shown in FIG. 9, the fairing panels 120 include a flap 126 that is attached to the panel at each location of the transverse supports 100 and guided around the transverse supports so that it is captured between the flap 126 and the fairing panel 120. The flap 126 can be closed by running a chord through reinforced grommet holes (not shown) between the flap 126 and the main fabric fairing panel 120. Alternatively, the entire fabric panel 120 can be constructed to fit over the tubular transverse supports 100 in the manner of a sleeve and then tensioned with a chord placed in grommet-reinforced holes and tightened. It is important that the fabric panels 120 be as tight as possible over the supporting tubular frames 116, 118 to avoid damage caused by aerodynamic forces moving the fabric rapidly against the tubular frames 116, 118.

Figures 10, 11:
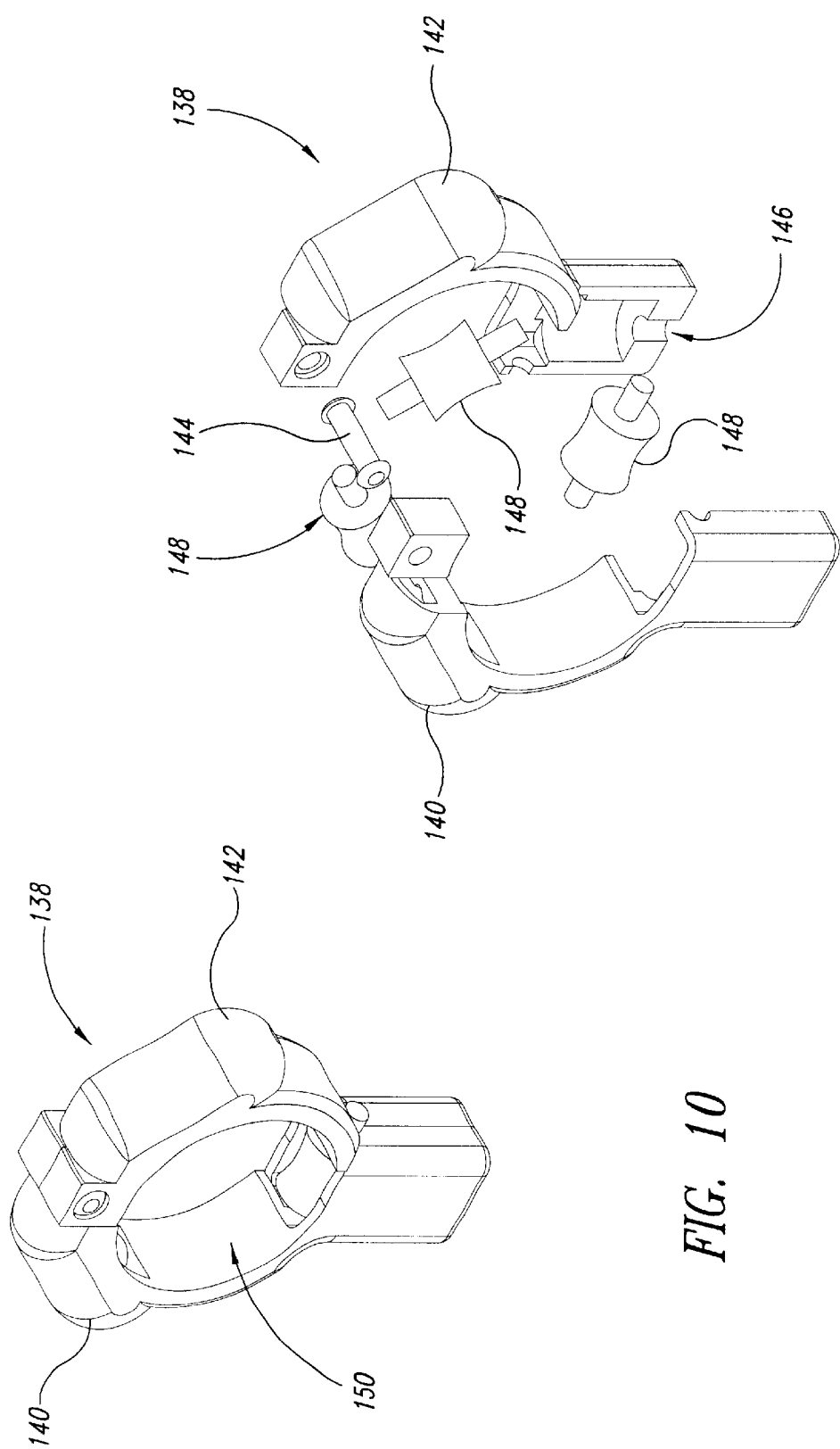
FIG. 10 is an isometric projection of a slider mount in an assembled configuration.
FIG. 11 is an exploded isometric projection of the slider mount of FIG. 10.

Because the wheel assembly 40 has approximately an eleven-foot range of longitudinal movement, the eleven-foot span must be covered to ensure continuity of the aerodynamic surface. In one embodiment of the invention, a plurality of slats 128 (see FIG. 12) are attached to the tubular frames 116 or 118 and covered with fabric 130 to form an accordion-like structure that folds and unfolds in response to telescopic movement of the first and second tubular frames 116, 118. Each slat 128 has a pivot point 132 formed at a top 134 and bottom 136 thereof. These pivot points are mounted in corresponding slider mounts 138, which are shown in more detail in FIGS. 10 and 11. Each slider mount is formed of first and second halves 140, 142 that are pivotally attached together at the top by a hinge pin 144 and at the bottom by suitable fasteners (not shown). A slot 146 is formed in the bottom of each of the first and second halves 140, 142 that is sized and shaped to receive and capture the pivot point 132 on the slat 128. In this manner, the slat 128 can rotate about the pivot points 132 in each of the slider mounts 138.

In addition, each slider mount 138 includes a plurality of roller bearings or rollers 148, in this case three rollers 148, that are positioned around the interior of a longitudinal bore 150 formed by the two halves 140, 142 to thereby bear against and provide a friction-free movement of the slider mount 138 on the tubularframes 116, 118.

Figure 8:
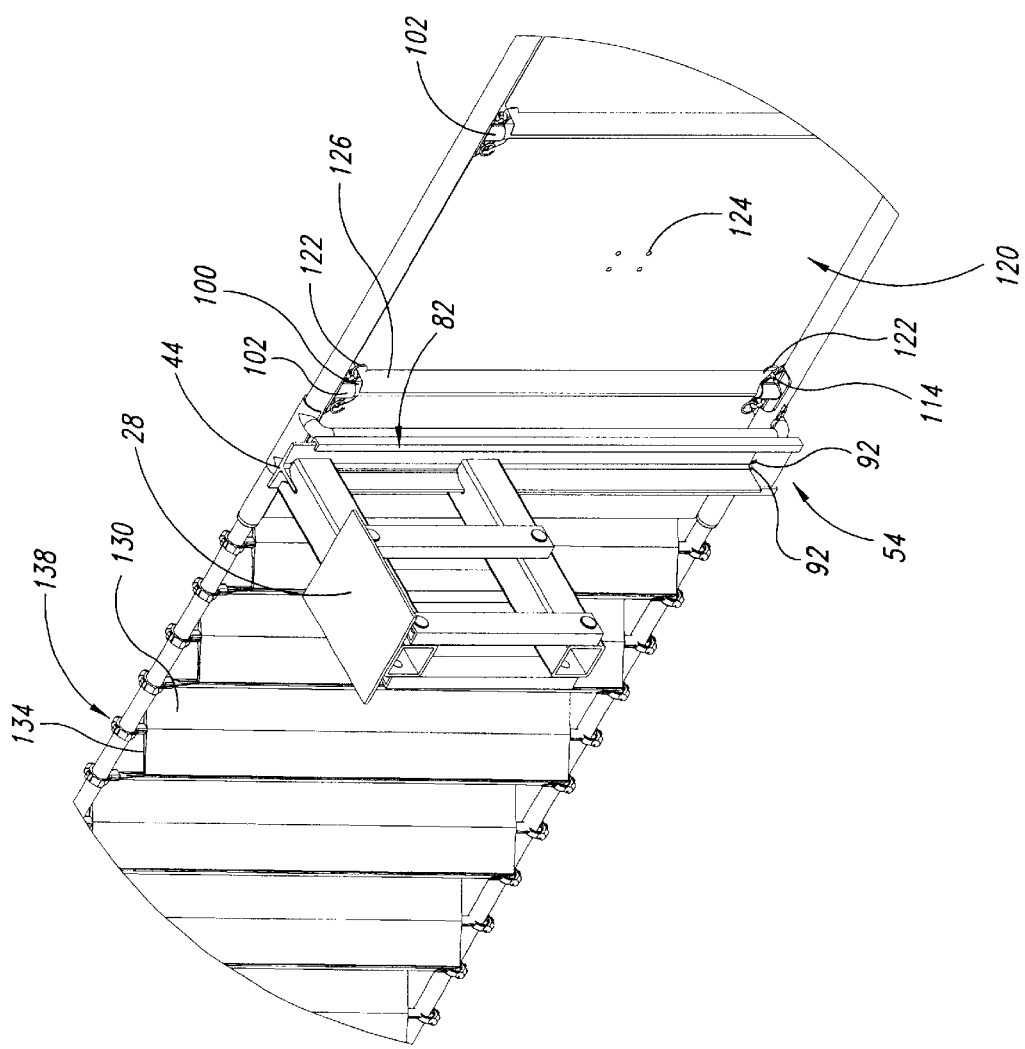
FIG. 8 is an enlarged view of the fairing of FIG. 4 showing the collapsible fairing panel in a partially-collapsed configuration.
Figure 12:
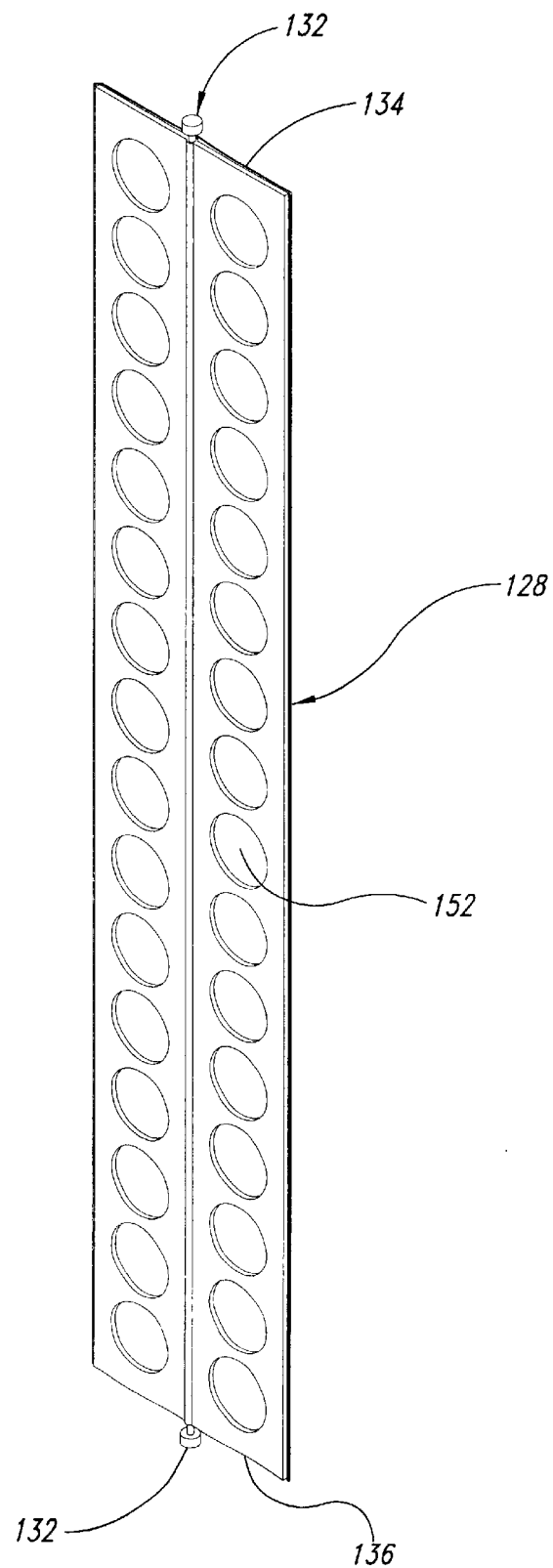
FIG. 12 is an isometric projection of one configuration of a slat for use in the foldable panel of the present invention.

Each slat 128, as shown in FIG. 12, has a plurality of holes 152 formed therein to lighten the weight of the slats. Preferably, the slats are covered by the fabric 138, and preferably are attached to the fabric by sewing, bonding, or other known method, to eliminate vibration caused by the wind. The fabric 130 is sewn together between each slat 128 to form a hinge point for folding of the fabric 130 as the fairing assembly collapses, as shown in FIG. 8.

Thus, with the rear wheel assembly or bogey 40 in the completely extended configuration, as shown in FIG. 9, the adjustable fairing panel 50 presents a completely planar surface where all slats are coplanar; and in the completely retracted or compressed position, the slats are all collapsed together in a face-to-face arrangement.

In an alternative embodiment a spring-powered take-up spool is mounted on the tubular frame 156 adjacent a stationary fairing panel 120. A fabric sheet 158 has one end attached to a transverse support 100 and the other end rolled up on the spool 154. The spool 154 is attached to a first fairing section 160 that is telescopically engaged with a second fairing section 162 having the point of slideable engagement 164 positioned between the transverse support 100 and the spool 154. Longitudinal movement of the first fairing section relative to the second fairing section 162 causes the sheet 158 to roll up on the spool 154 and to unroll from the spool 154, providing a continuous planar surface at all times, regardless of the overall length or relative position of the first and second fairing sections 160, 162. Alternatively, a rigid planar fabric support attached to either of the first and second fairing sections could be utilized that would move in a parallel bypass track to the main planar structure. A spring-loaded roller would maintain tension in the make-up fabric loop connecting the support panel to the main fabric sheet.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

What is claimed is:

1. A fairing for a trailer having an adjustable rear wheel assembly and a corresponding tractor unit having rear wheels, the fairing comprising:

a first fairing section configured for attachment to the trailer rear wheel assembly;

a second fairing section configured for attachment to the trailer; and an adjustable fairing panel coupled to the first and second fairing sections and configured to extend and collapse as the position of the rear wheel assembly is adjusted longitudinally on the trailer.

2. The fairing of claim 1 wherein the first and second fairing sections comprise a telescopic frame having a first frame member telescopically coupled to a second frame member.

3. The fairing of claim 2 wherein the adjustable fairing panel comprises a plurality of vertically-oriented slats having a foldable panel mounted thereon.

4. The fairing of claim 3 wherein the plurality of slats are slideably mounted to the telescopic frame and configured to rotate about a vertical axis to guide folding and unfolding of the foldable panel.

5. The fairing of claim 4 wherein the foldable panel is constructed of fabric.

6. The fairing of claim 5 wherein the fabric is mounted to the telescopic frame under tension.

7. A trailer assembly for use with a tractor having a moveable rear wheel assembly, the trailer assembly comprising:
- a trailer having rear wheels adjustably mounted thereon and a front configured for attachment to the tractor;
- a first fairing section attached to the moveable rear wheel assembly;
- a second fairing section attached to the trailer to be adjacent the rear wheels of the tractor; and
- an adjustable fairing panel coupled to the first and second fairing sections and configured to extend and collapse as the position of the rear wheels are adjusted longitudinally on the trailer.

8. The assembly of claim 7 wherein the adjustable fairing panel comprises a foldable panel.

9. The assembly of claim 8 wherein the adjustable fairing panel comprises a plurality of vertically-oriented slats slideably mounted on a telescopic frame formed by the first and second fairing sections, the plurality of slats having the foldable panel mounted thereon.

10. The assembly of claim 9 wherein the plurality of slats are mounted to each rotate about a vertical axis to guide folding and unfolding of the foldable panel.

11. The assembly of claim 10 wherein the foldable panel is constructed of fabric.

12. The assembly of claim 11 wherein the fabric is mounted to the telescopic frame under tension.

13. The assembly of claim 7 wherein the first and second fairing sections and the adjustable fairing panel are attached to the trailer to move as a unit between a raised position and a lowered position.

14. The assembly of claim 7, wherein the adjustable fairing panel comprises a plurality of slats, each slat mounted on a telescopic frame by a top slider mount and a bottom slider mount, each slider mount configured to slide on the telescopic frame and to hold the respective slat in rotatable engagement for rotation about a longitudinal axis of the slat.

15. The assembly of claim 14, wherein each slider mount includes a plurality of rollers mounted thereon to support the slider mount on the telescopic frame.

16. The assembly of claim 7, comprising a first fairing mount configured to attach the first fairing section to the movable rear wheel assembly and a second fairing mount configured to attach the second fairing section to the trailer, each fairing mount comprising at least one cable attached to an actuator on the fairing mount and attached to the corresponding fairing section for moving the corresponding fairing section relative to the fairing mount.

* * * * *